June 13, 1950 P. WARE 2,511,185
CONSTANT BAND WIDTH COUPLING CIRCUIT
Filed Aug. 3, 1946
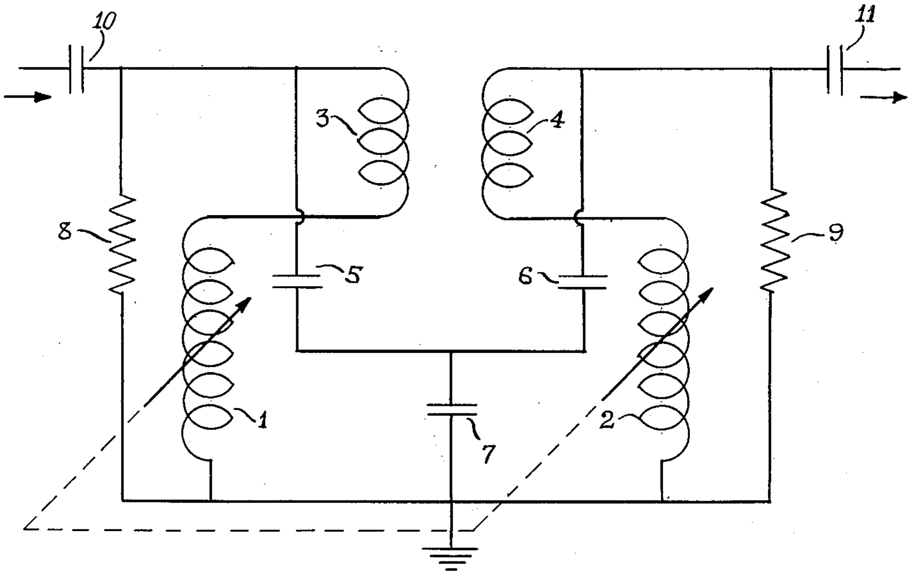
Paul Ware, INVENTOR
BY Charles W. Mortimer, Atty.

Patented June 13, 1950 2,511,185

UNITED STATES PATENT OFFICE 2,511,185

CONSTANT BAND WIDTH COUPLING CIRCUIT

Paul Ware, Upper Montclair, N. J., assignor to Allen B. Du Mont Laboratories, Inc., Passaic, N. J., a corporation of Delaware Application August 3, 1946, Serial No. 688,356

5 Claims. (Cl. 178—44)

This invention relates to a constant bandwidth tunable coupling circuit for radio frequency amplifiers. In carrying out the invention two tuned circuits, each consisting of two coils in series connected in parallel with two capacitors, are coupled by magnetic means through a coil of each circuit and a capacitor that is common to both circuits. The coil of each circuit that is not magnetically coupled to the coil of the other circuit has its inductance made variable. These variable inductances are ganged so that their inductances remain equal throughout the tuning range.

With this invention energy is transferred with a minimum of attenuation over a wide band of frequencies. For example, the invention may be used for passing television bands of 6 megacycles width throughout a wide range of high frequencies say from 50 to 220 megacycles, or more.

The invention will be described in connection with a coupling circuit between the output of a tube in a radio frequency amplifier and the input to a mixer tube of a receiver that is adapted to receive television and other signals in the range of frequencies from 50 megacycles to 220 megacycles utilizing variable inductance in the tuning elements although, the invention is not limited to this particular use.

The invention may be understood from the following description in connection with the accompanying drawing.

In the drawing reference character 1 indicates a coil of variable inductance and reference character 2 indicates another such coil. The two are ganged for uni-control. Coils 1 and 2 are so constructed and arranged that they always have substantially equal inductances regardless of the position of the ganged uni-control. Fixed coils 3 and 4, that are inductively coupled to each other, are connected in series with the variable inductance coils 1 and 2, respectively.

The common connection of resistance 8, variable inductance coil 1, one side of condenser 7, and the common connection of resistance 9 and variable inductance 2 are all connected to ground. The other side of condenser 7 is connected to condensers 5 and 6. The other side of condenser 5 is connected to the common connection of fixed inductance coil 3 and resistor 8. The other side of condenser 6 is connected to the common connection of the fixed inductance 4 and the resistor 9.

The incoming signal is connected through condenser 10 to the common connection of the resistor 8 and the coil 3. The output of the tunable wide range, wide-band pass circuit is taken off at the common connection of the fixed inductance 4 and resistor 9 and fed through the condenser 11 to the control grid of the mixer tube.

In addition to connecting the band pass coupling circuit as described the condensers 10 and 11 may also act as direct current blocking means.

Both inductive and capacitive coupling are utilized. Inductive coupling is provided by the fixed inductances of coils 3 and 4 which are in a fixed physical relation to each other. Capacitive coupling is provided by the capacitor 7 common to both circuits.

Two tuned circuits are provided. One of them consists of coils 3 and 1 in series, shunted by capacitors 5 and 7 in series and also shunted by damping resistor 8. The other consists of coils 4 and 2 in series, shunted by capacitors 6 and 7 in series and also shunted by the damping resistor 9. These two resonant circuits are adjusted so as to be substantially in tune with each other throughout the range.

The desired wide bandwidth is obtained by over-coupling these two circuits. The two coupled coils 3 and 4 are so wound and connected that the mutual inductance effect produced by them induces a current that opposes the current flowing as a result of the capacitive coupling that is provided by capacitor 7. Tests indicate that this bucking effect is what maintains the width of the band that is passed notwithstanding the wide tuning range that is afforded. With capacitive coupling alone, the bandwidth would vary about directly with frequency. With inductive coupling alone the bandwidth appears to vary about as the square of the tuning frequency.

The maximum values of each of the variable inductance coils 1 and 2 may be of the order of 1.0 microhenry while the values of fixed inductance coils 3 and 4 may be each approximately 0.06 microhenry. The coupling condenser 7 may be fixed in value at approximately 8.0 micromicrofarads. The capacitors 5 and 6 may be adjustable and each have a range of 4–30 micromicrofarads. The blocking capacitors 10 and 11 may each have a capacitance of 15 micromicrofarads and the damping resistors 8 and 9 may each have a resistance of 10,000 ohms. Any of the usual amplifier or mixer tubes suitable for very high frequency coverage may be employed in connection with this circuit such as the 6J6 or the 6AK5 vacuum tubes. The magnitude and polarity of the mutual coupling between the fixed inductance coils 3 and 4 dominates the wave shape in the higher frequency region when the circuit is being adjusted. These fixed inductance coils have less effect than the adjustment of the capacitors 5 and 6 in the region of the lower frequencies of the band covered.

With the two forms of coupling, as described, the magnetic coupling opposes the electrostatic coupling, and the overall result is such that the variation of the band-pass will not exceed 2:1 even with the tuning ratio in excess of 4:1, as described.

In the embodiment described, tests indicate that at frequencies from 50 megacycles to 220 megacycles the width of the band of frequencies that is passed is kept between four and seven megacycles. The invention may be adapted to pass wider or narrower bands at the same or different ranges of frequencies.

What is claimed is:

1. In a device of the character described, two tuned circuits each comprising a coil of fixed inductance, said coils being inductively coupled, each circuit also comprising a coil of variable inductance in series with one of said coils of fixed inductance, a capacitor in parallel with each series circuit and a capacitor common to both of said circuits.

2. In a device of the character described, two tuned circuits each comprising a coil of fixed inductance, said coils being inductively coupled, each circuit also comprising a coil of variable inductance in series with its coil of fixed inductance and two capacitors in series connected in parallel with each series circuit in which one capacitor of each pair of capacitors is a single capacitor common to both circuits.

3. In a device of the character described, two tuned circuits each comprising a coil of fixed inductance, said coils being inductively coupled, each circuit also comprising a coil of variable inductance in series with one of said coils of fixed inductance, one end of each of said series circuits being at ground potential, two capacitors in series connected in parallel with each series circuit in which one capacitor of each pair of capacitors is a single capacitor common to both circuits, said single capacitor being connected to said ends at ground potential.

4. In a device of the character described, two tuned circuits each comprising a coil of fixed inductance, said coils being inductively coupled, each circuit also comprising a coil of variable inductance in series with one of said coils of fixed inductance, and two capacitors in series connected in parallel with each series circuit in which one capacitor of each pair of said two capacitors is a single capacitor common to both circuits, said coils of fixed inductance being coupled to oppose the coupling of said common capacitor.

5. In a device of the character described, two tuned circuits each comprising a coil of fixed inductance, said coils being inductively coupled, each circuit also comprising a coil of variable inductance in series with one of said coils of fixed inductance, one end of each of said series circuits being at ground potential, and two capacitors in series connected in parallel with each series circuit in which one capacitor of each pair of said two capacitors is a single capacitor common to both circuits, said single capacitor being connected to said ends at ground potential, said coils of fixed inductance being coupled to oppose the coupling of said common capacitor.

PAUL WARE.

REFERENCES CITED

The following references are of record in the file of this patent:

UNITED STATES PATENTS

| Number | Name | Date |
|---|---|---|
| 1,872,318 | Meissner | Aug. 16, 1932 |
| 1,943,416 | Braden | Jan. 16, 1934 |
| 2,025,128 | Rust | Dec. 24, 1935 |
| 2,052,703 | Franham | Sept. 1, 1936 |
| 2,106,226 | Schaper | Jan. 25, 1938 |
| 2,224,115 | Schlesinger | Dec. 3, 1940 |
| 2,225,085 | Schlesinger | Dec. 17, 1940 |
| 2,227,035 | Schlesinger | Dec. 31, 1940 |
| 2,245,722 | Rust | June 17, 1941 |
| 2,270,017 | Brailsford | Jan. 13, 1942 |
| 2,404,270 | Bradley | July 16, 1946 |

OTHER REFERENCES

"The Design of the Band Pass Filter," by N. R. Bligh; article in "The Wireless Engineer and Experimental Wireless," published in February 1932, England; 6 pages.

"The Theory of Band-Pass Filters for Radio Receivers," by C. W. Oatley; article in "The Wireless Engineer and Experimental Wireless," published in November 1932, England; 7 pages.